United States Patent
Kahn et al.

(10) Patent No.: US 10,495,479 B1
(45) Date of Patent: *Dec. 3, 2019

(54) METHOD AND APPARATUS FOR AN IMPROVED MAP DISPLAY

(71) Applicant: DP TECHNOLOGIES, INC., Scotts Valley, CA (US)

(72) Inventors: Philippe Richard Kahn, Santa Cruz, CA (US); Arthur Kinsolving, Santa Cruz, CA (US)

(73) Assignee: DP TECHNOLOGIES, INC., Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/954,738

(22) Filed: Nov. 30, 2015

Related U.S. Application Data

(63) Continuation of application No. 12/941,001, filed on Nov. 5, 2010, now Pat. No. 9,200,903.

(51) Int. Cl.
  *G01C 21/00* (2006.01)
  *G01C 21/36* (2006.01)
  *G01C 21/34* (2006.01)

(52) U.S. Cl.
  CPC ..... *G01C 21/3673* (2013.01); *G01C 21/3415* (2013.01)

(58) Field of Classification Search
  CPC .................. G01C 21/3673; G01C 21/3415
  See application file for complete search history.

(56) References Cited

U.S. PATENT DOCUMENTS

| | | | |
|---|---|---|---|
| 6,140,943 A * | 10/2000 | Levine | 340/995.12 |
| 7,076,505 B2 * | 7/2006 | Campbell | 701/438 |
| 8,395,529 B2 * | 3/2013 | Seder et al. | 340/905 |
| 2007/0203642 A1 * | 8/2007 | Arnold-Huyser | 701/211 |
| 2007/0282661 A1 | 12/2007 | Franco | |
| 2008/0097698 A1 * | 4/2008 | Arnold-Huyser et al. | 701/300 |
| 2009/0125229 A1 * | 5/2009 | Peri et al. | 701/201 |
| 2009/0254843 A1 | 10/2009 | Van Wie et al. | |
| 2010/0125478 A1 | 5/2010 | Bisht | |
| 2010/0190510 A1 | 7/2010 | Maranhas et al. | |
| 2010/0211425 A1 | 8/2010 | Govindarajan | |
| 2010/0253541 A1 * | 10/2010 | Seder et al. | 340/905 |
| 2011/0238647 A1 | 9/2011 | Ingram et al. | |
| 2011/0242271 A1 | 10/2011 | Ogale et al. | |

OTHER PUBLICATIONS

"Apple plagiarizing others' work in patent diagrams?," http://www.ipodnn.com/articles/10/08/06/2009.document.depicts.existing.iphone.app/, Accessed Nov. 10, 2010, 16 pages.

Chadwick, Bill, "Google Maps and Microsoft MapCruncher," http://www.bdcc.co.uk/GoogleCrunch/Crunch.htm, Oct. 2007, Accessed Sep. 23, 2010, 19 pages.

Navteq, "Navigation Software for the Apple iPhone 3G and 3GS," User Manual, iGo My Way 2009, Jul. 2009, Ver 1.0, 78 pages.

* cited by examiner

*Primary Examiner* — Adam M Alharbi
(74) *Attorney, Agent, or Firm* — HIPLegal LLP; Judith Szepesi

(57) ABSTRACT

A method comprises displaying a map including a plurality of streets and displaying street names for a first subset of the plurality of streets shown on the map, the street signs displayed only for the first subset of streets that are directly accessible from the user's current location and are along the user's path, wherein a second subset of streets that are not directly accessible from the user's current location, including streets behind the user's current location, do not have the street signs.

20 Claims, 12 Drawing Sheets

METHOD AND APPARATUS FOR AN IMPROVED MAP DISPLAY

RELATED APPLICATION

The present application is a continuation application of U.S. patent application Ser. No. 12/941,001, filed on Nov. 5, 2010, and incorporates that application by reference in its entirety.

FIELD OF THE INVENTION

The present invention relates to maps, and more particularly to presenting maps to a user.

BACKGROUND

Global positioning system (GPS) systems are becoming more common. GPS is being used to show users their current location as well as directions to a selected destination.

Generally, GPS systems provide mapping by using vector data describing each street. Map displays can get very busy with street names, and points of interest and similar displays.

Newer GPS systems can provide a three-dimensional view of the area, especially in conjunction with providing directions. Using a three-dimensional view, or perspective view, generally involves using vector data to generate a three dimensional representation of the map.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
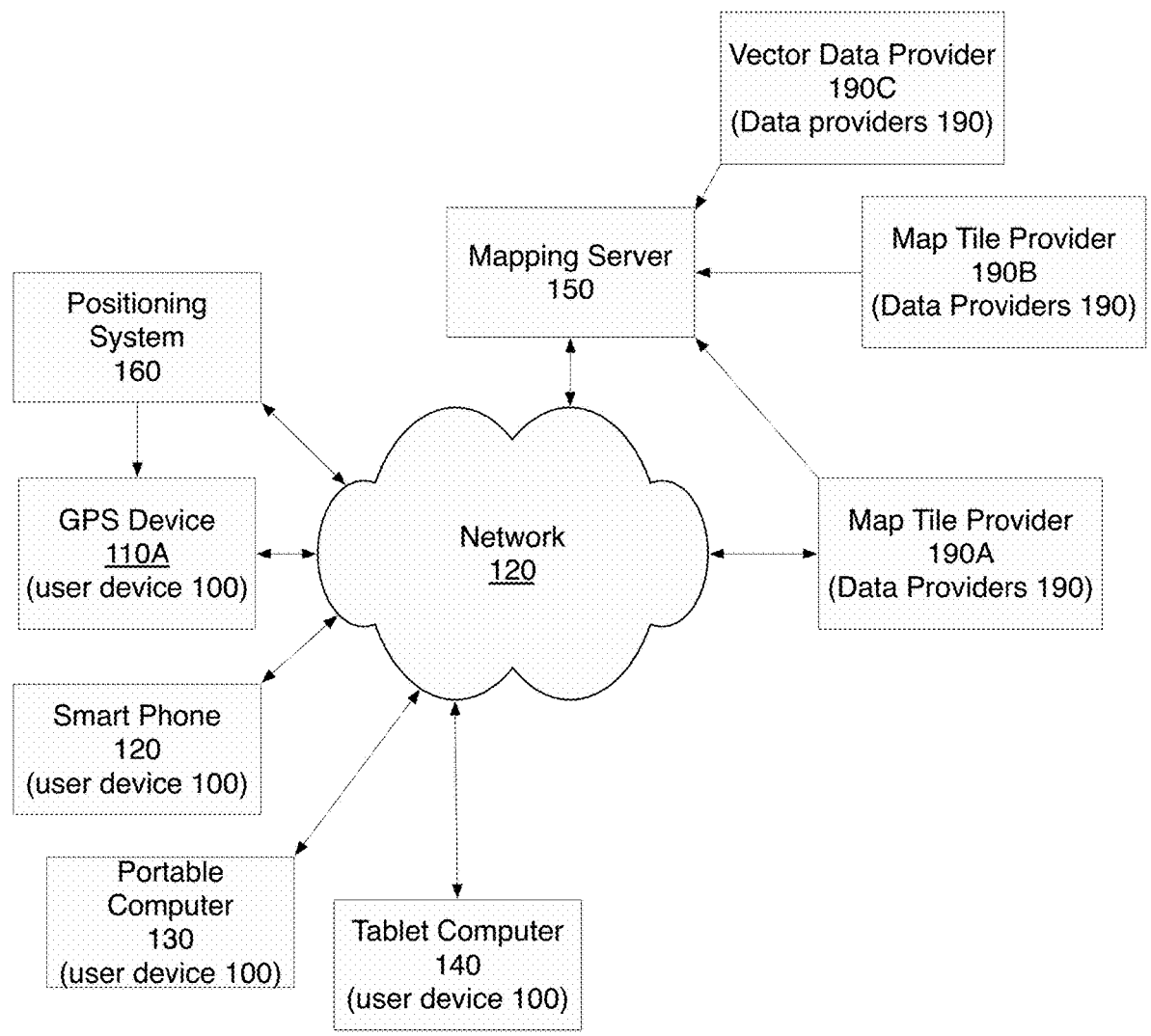
FIG. 1 is a block diagram of one embodiment of the elements which may be used to receive map data.

The method and apparatus described is for a mapping application. In one embodiment the system obtains a plurality of map tiles, each of the map tiles representing a two-dimensional map of an area. The system then generates a perspective map tile from the two-dimensional map tile and uses one or more of the perspective map tiles to display a map. The map may include an indication of a current location. In one embodiment the two-dimensional map tiles may be obtained from a plurality of different sources. In one embodiment, the map tile data may be normalized, so that the map data appears identical regardless of source. In one embodiment, when selecting map tiles from one of a plurality of sources, the system may select based on various criteria such as rating, cost, last update, etc.

In one embodiment, the system may use vector data to generate a route for the user. In one embodiment, the system is used to detect differences between vector data and map tile data. In one embodiment, the system may adjust the raster data or the vector data to adjust for such differences.

In one embodiment, the system is capable of generating routing without vector data based on a defined path. A defined path is a path which has been previously indicated. This may be available with physically recorded tracks, e.g. recorded with a GPS. This may be available with manually generated maps. In one embodiment, manual generation of mapping may be done by tracing a route on the map image directly. This makes it possible to route in "indefinite" terrain that hasn't been properly mapped so no vector data is available.

In one embodiment, the map or route display is altered to remove street names on the map tiles and generating street signs associated with a plurality of streets shown on the map. In one embodiment, the set of street signs displayed are pruned to show only a subset of street signs representing a next set of roads accessible from the current location. In one embodiment, the system uses location technologies such as a compass and GPS or network position data to show only streets ahead of the user (e.g. not behind or to the side), so that street signs pop up as you rotate around. In one embodiment, the current street, and the one street directly behind the user is shown, as these are often used by users in figuring out their location. In one embodiment, the pruning is zoom level dependent. In one embodiment, the pruning is user speed dependent, so that only those streets/points of interest which are reasonably reachable given the user's current position and speed are shown.

In one embodiment, the system further optionally adds points of interest to the map or route display. In one embodiment, this includes determining whether there is a point of interest appropriate to the user's profile on the map, and displaying the point of interest only when it is easily reachable from the current location.

In one embodiment, routing does bi-directional route checking. The system, in determining an optimal route from point A to point B routes bi-directionally, e.g. from point A to point B, and from point B to point A. It then uses this bidirectional routing to optimize the requested route.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 is a block diagram of one embodiment of the elements which may be used to receive map data. The system may include, in one embodiment, a user device 100 which may be a portable global positioning system (GPS)

device 110, smart phone 120, portable computer 130, tablet computer 140, or other device which is capable of interacting with the user, and displaying mapping information.

The system includes a mapping server 150, which provides map data to the various devices 100. In one embodiment, the devices 100 may be pre-loaded with data. The data may include map tiles and vector data. Perspective or 3D map tiles, in one embodiment, may be generated by the mapping server based on 2D map tile data. Vector data may be used at the user device 100 or server 150 to generate routing. The mapping server 150 in one embodiment is coupled to data providers 190, The data providers 190 in one embodiment include a first map tile provider 190A, a second map tile provider 190B, and a vector data provider 190C. The data providers 190 provide map data (which may include 2D map tiles, vector data, 3D map tiles, and routing data), to mapping server 150. Mapping server generates a cohesive map, and routing information for user devices 100, in one embodiment, using the map data.

In one embodiment, the user device 100 may be coupled to a positioning system 160. The positioning system 160 may be a GPS satellite system, a network triangulation-based system, a wireless access point based system, or another system for determining the user device's location.

In one embodiment, there may be an additional input device 170 which enables manual input of a route, for example tracing a route on an image of a map. This would enable routing for a location for which vector data is not available.

Figure 2:
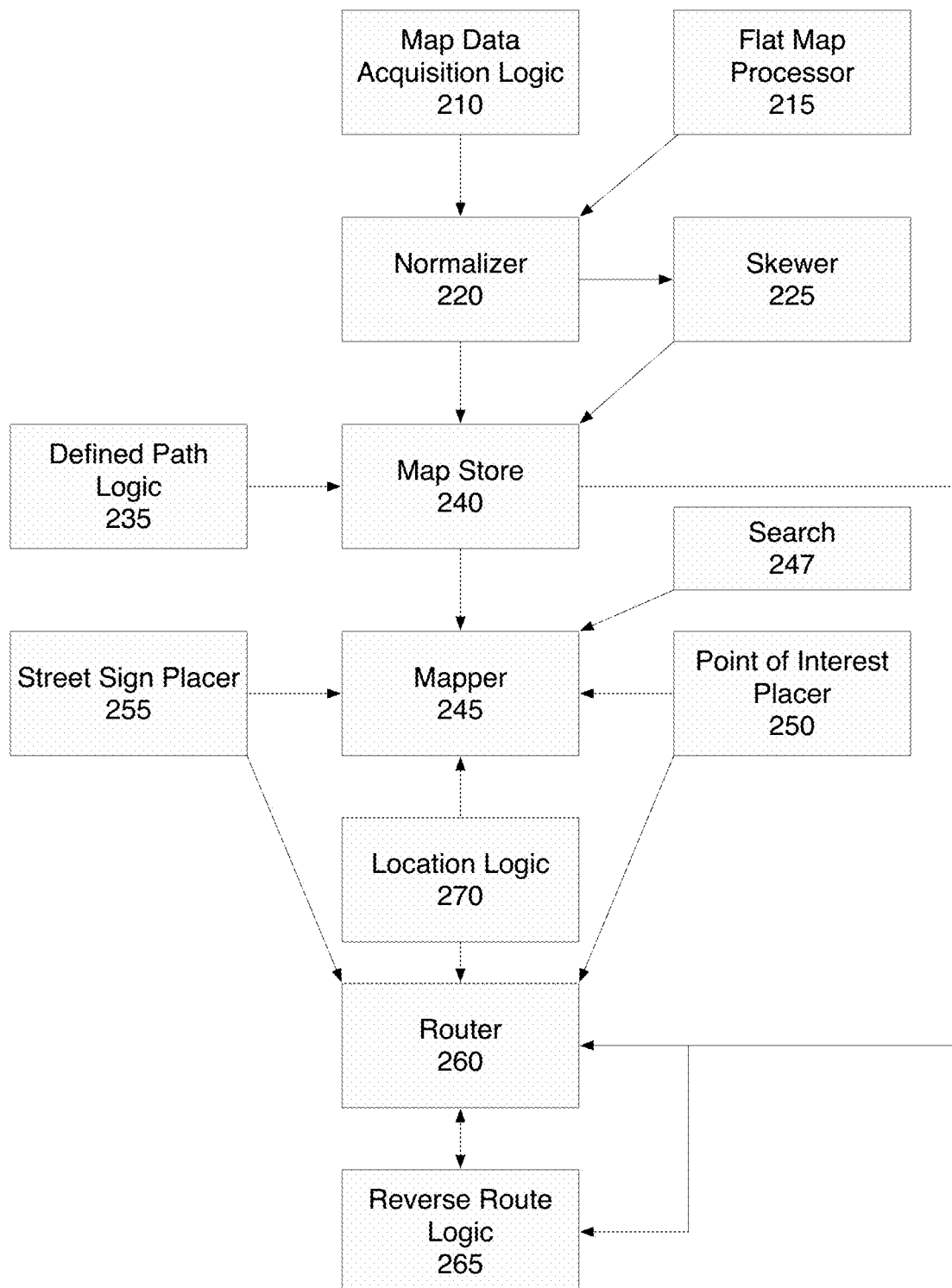
FIG. 2 is a block diagram of one embodiment of the mapping application.

FIG. 2 is a block diagram of one embodiment of the mapping application. The mapping application, in one embodiment, is split between the user device 100 and the mapping server 150. In one embodiment, the split between the mapping server 150 and user device 100 may depend on user device capabilities. For example, in one embodiment, a GPS-device which is capable of generating its own 3D map tiles from 2D map tile data and its own routing may only receive 2D map tiles from mapping server. In one embodiment, for self-contained GPS-devices, all processing may take place on the user device 100. In contrast, for a low power user device 100 which does not have processing capabilities, the mapping server 150 may provide image data including maps, routing data, etc. over the network, and the only aspect provided by the user device 100 may be the display of this information.

Map acquisition logic 210 in one embodiment acquires map data from multiple providers, if available. In one embodiment, map data acquisition logic 210 evaluates map data providers, and selects a best provider for a zone. A zone may be defined as a single map tile, a plurality of map tiles, a city or similar geographic unit, a county, a country, or a continent.

The map image data is then normalized by normalizer 220. In one embodiment, normalization standardizes the resolution, size, scale, and colors of image. The data is then provided to map store 240. In one embodiment, skewer 225 produces perspective skewed images, which allow two-dimensional map tiles to appear three dimensional, for the purposes of displaying a map with or without routing. The perspective skewed map image data is also stored in map store 240 in one embodiment.

Mapper 245 utilizes the map data to display a map to a user. In one embodiment, the mapper utilizes the user's location from location logic 270. In one embodiment, the user may choose to see a map using a location function (e.g. show map around my current location), a location search function (show map at location I am interested in), or a destination search function (show map around a particular destination). In one embodiment, search 247 provides a search function to the user. In one embodiment, the system provides multiple methods of search.

Figure 9A:
FIG. 9A is an exemplary selection screen.

FIG. 9A illustrates one embodiment of providing an interface for searching. Of course, the illustrated interface is only an example, and various configurations may be used.

For example, the system may include the ability to search by name ("Search") for a location, which may be a business, a point of interest, or other type of location. The system may provide the ability to search for an address ("Address"). Additionally, the user may search via an address book, locally ("@") or on a social network ("Social"). In one embodiment, if the social network ("Social") provides the option to have people "check in" into a location, those locations may be made available to the user. In one embodiment, for example, the "Social" provides access to Facebook Places™ or FourSquare locations which are in the area being viewed by the user. In one embodiment, the "Social" provides access to friends' locations based on having checked in with the social network associated with the search. In one embodiment, the user may associate one or more social networks with the "Social" search. For example, in one embodiment, friends who have checked in with Facebook Places™ and FourSquare™ check-ins may both be shown.

In one embodiment, the system further provides various direct icons to search for businesses that are particularly likely to be of interest. In the example shown these icons represent a coffee shop, gas station, hospital, airport, parking, and restaurant. Of course these direct icons are merely illustrative, and any or no such icons may be present. In one embodiment, the user may alter the direct icon selection shown on the search screen, based on his or her preferences. For example, a user who does not drink coffee may remove the "coffee" selection" and replace it with an alternative selection, such as park, or bar, etc. In one embodiment, the user may replace the icons on the search screen.

Additionally, in one embodiment, the browse option provides a menu-driven drill-down to search for particular types of locations and or businesses.

In one embodiment, the search further enables the user to search for points of interest, or other location-linked information in an encyclopedia. In one embodiment, the encyclopedia search provides the ability to see points of interest, without knowing their name, or anything else about it. For example, a visitor to San Francisco may be aware of Fisherman's Wharf, and know to search for it, but may never have heard of the Exploratorium, and thus wouldn't even know how to search for it. By enabling an encyclopedia-based search, the user can see notable places around a particular location. In one embodiment, the encyclopedia is the online Wikipedia™. In one embodiment, the encyclopedia, or a copy of a portion of it related to local points of interest may be locally stored on the user's system. In another embodiment, the system may go to the web-accessible public site, e.g. mobile.wikipedia.org when the encyclopedia option is selected.

In one embodiment, when the encyclopedia option is selected, the items that have associated entries are made available on a map. In one embodiment, the user may further click through and read the encyclopedia entry associated with any location. In one embodiment, the encyclopedia entry is optimized for the user's viewing device, e.g. GPS device, mobile phone, tablet computer, etc.

Figure 9B:
FIG. 9B is an exemplary map display including a route.
Figure 9C:
FIG. 9C is an exemplary map display including a POI.

In one embodiment, street sign placer 225 is used to place street names on the map. In one embodiment, only a subset of street names, those relevant to the user's current location/ route are shown. Similarly, in one embodiment, point of interest placer 250 is used to place points of interest on the map or route. FIG. 9B shows an example of street-names being displayed. FIG. 9C shows an example of a point of interest being shown.

In one embodiment, the system includes a reverse route logic 265 which uses the comparison of the reverse route to optimize routing.

In one embodiment, the system includes a defined path logic 235 which can be used to define a path in an environment where vector data, usually used for routing, is not available.

In one embodiment, the system includes a flat map processor 215 which receives flat map data and enough information to determine the location of the flat map data, and processes the two dimensional map data to properly scale the data, and enable it to be included within the map store 240. In one embodiment, flat map processor 215 may be used to enable manual routing.

Figure 3:
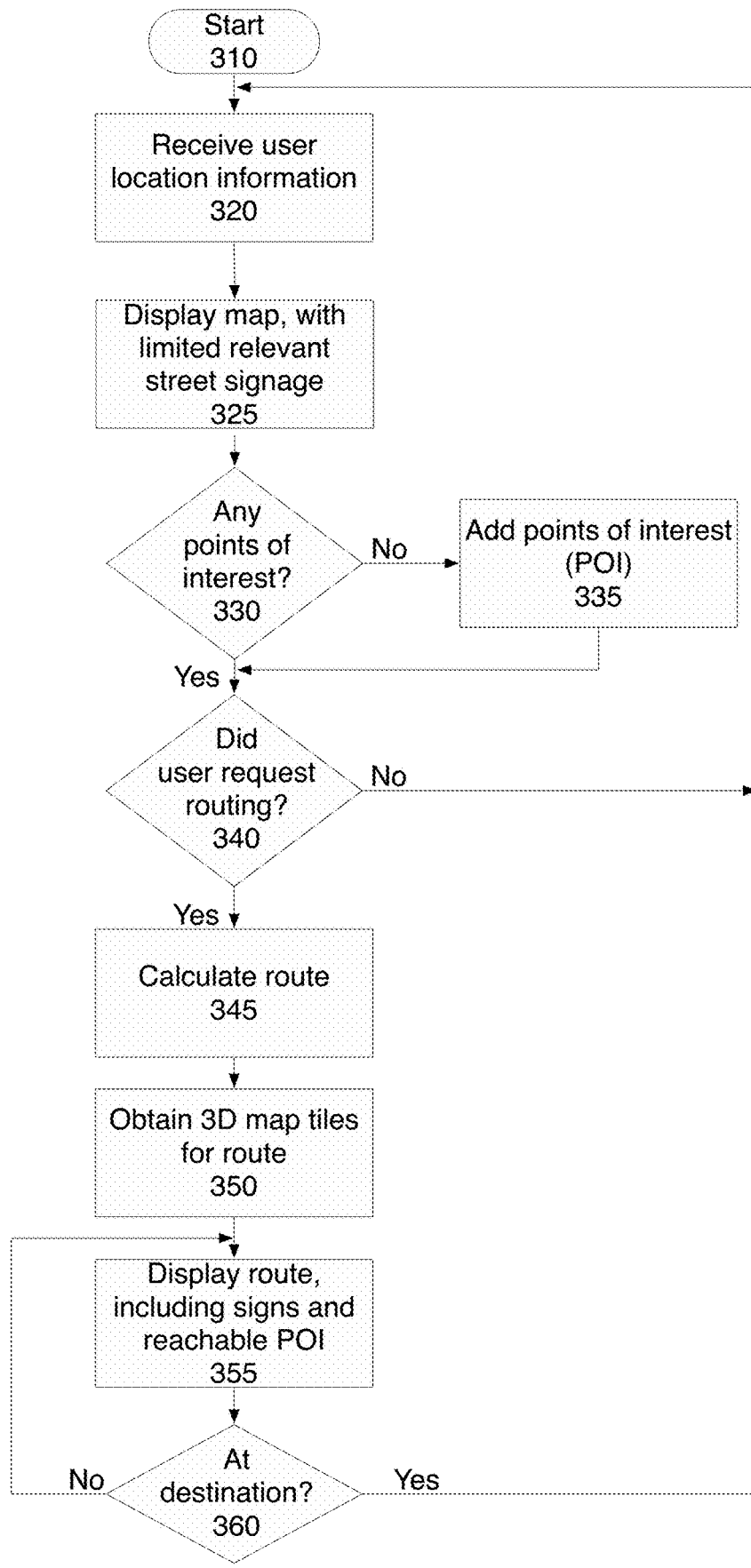
FIG. 3 is an overview flowchart of one embodiment of the mapping and routing.

FIG. 3 is an overview flowchart of one embodiment of the mapping and routing. At block 310, the process starts. In one embodiment, the process starts when the user actives the mapping and/or routing application. At block 320, the process receives the user's location information. The location information may be obtained using GPS, network triangulation, wireless network proximity calculations, or other methods.

Once the user's location is determined, at block 325, the map with directional street signs is displayed in one embodiment. In one embodiment, the directional street sign display utilizes the location and the direction the user is viewing the map. It then displays the relevant street signs only. That is, rather than showing all street names aligned with the street itself, the system displays street signs in the direction pointed by the device/user, and only a limited number of those signs. FIG. 9B illustrates an exemplary screen shot of such a display. The process of determining which street signs to display is described below in more detail. In one embodiment, the limited street signs are displayed only on perspective maps. When a flat two dimensional map is displayed, the street names are shown on each street, as on standard paper maps.

At block 330, the process determines whether there are any points of interest within the displayed map segment displayed. If so, at block 335 the points of interest are added to the display, in on embodiment. The points of interest, in one embodiment, are defined based on a user profile/preference set. One embodiment of this process is described below. The process then continues to block 340. If no points of interest were found, the process continued directly to block 340.

At block 340, the process determines whether the user requested routing. If not, the process returns to block 320, to continue receiving user location information. In one embodiment, the map display is updated with current information, as the user moves around.

If the user requested routing, as determined at block 340, the process continues to block 345. At block 345, the route is calculated. In one embodiment of this process is described below.

At block 350, three dimensional map tiles are obtained for the route. In one embodiment, the three dimensional map tiles are perspective skew generated from two dimensional map tiles. One embodiment of this process is described below. In one embodiment, the maps may be obtained from local memory or from a server.

At block 355, the routing map is displayed, with limited relevant street signage and reachable points of interest. In one embodiment, the points of interest displayed are those that the user could reach based on their current location, orientation, and speed. In one embodiment, the user's route is also considered, e.g. only points of interest along the route are displayed. In one embodiment, the routing map shows a limited map segment of the route.

At block 360, the process determines whether the user has reached his or her destination. If not, the process continues to block 355, to continue displaying the routing map, as updated based on a current location. If the destination is reached, the process returns to block 320, to continue receiving user location information, and display the location map. This process, in one embodiment, continues while the application is active.

Figure 4:
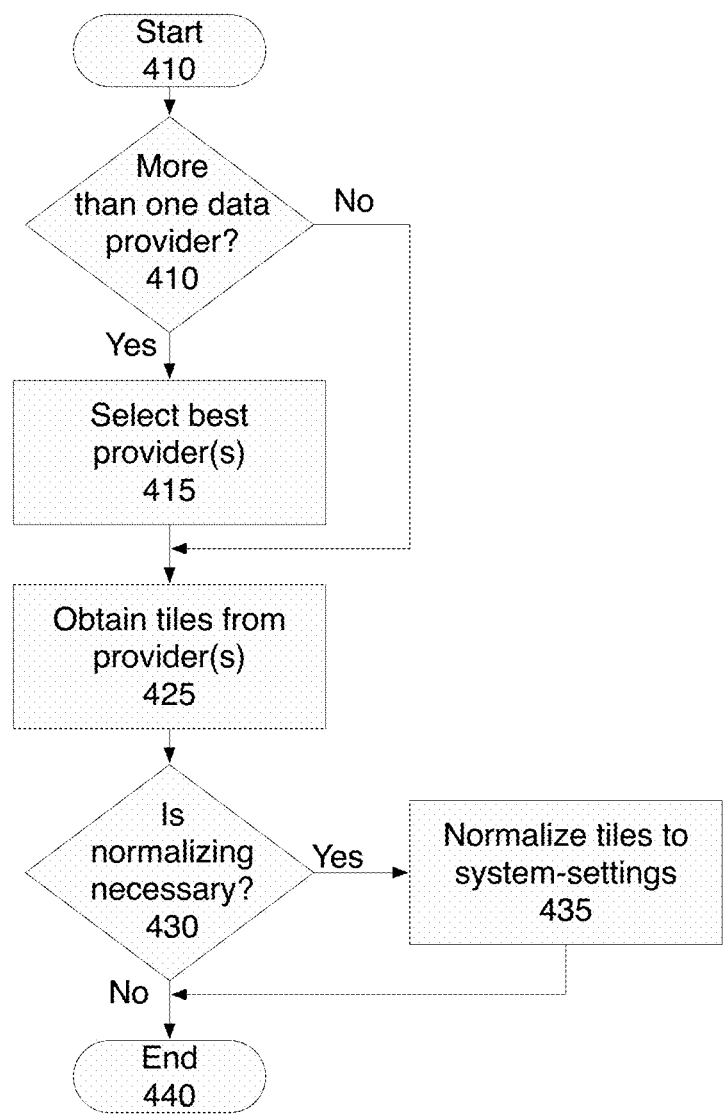
FIG. 4 is a flowchart of one embodiment of obtaining map data.

FIG. 4 is a flowchart of one embodiment of obtaining map data. In one embodiment, the system can obtain map image data (an image stored as raster data, in one embodiment) from a different source than vector data. Vector data represents spatial data in digital form, using coordinate pairs (x, y) to represent locations. The data may take the form of single points, lines, arcs or closed lines (polygons).

At block 410, the process determines whether more than one provider is available to supply the map data. In one embodiment, depending on the location, multiple providers may be available for mapping data. These providers may include government databases, commercial providers such as Navteq™, crowd-sourced providers such as OpenStreetMap™, etc.

If multiple providers are available, at block 415, the best provider is selected. In one embodiment, the best provider may be selected per zone. The zone may be a single map tile, a bounded geographic area such as a borough or township, a county, a state, a country, or even a continent. For example, OpenStreetMap may be the best provider for the city center area of a particular town, while its maps of the outlying regions may be subpar. In one embodiment, the best provider may be selected based on smaller areas. In one embodiment, the best provider may be selected based on the completeness of the data, the most recent update to the data, and the resolution of the data. In one embodiment, the best provider may further be selected based on the cost of the map data. In one embodiment, the priority for selecting the best provider is completeness of data within the region/zone being obtained. In one embodiment, the secondary evaluation is when the map data was last updated. The process then continues to block 425.

If only a single provider was found, at block 410, the process continues directly to block 425.

At block 425, the map data is obtained from the provider (s). In one embodiment, the map data may include image data (e.g. map tiles) and vector data (e.g. descriptor data which can be used to generate image data as well as routing.)

At block 430, the process determines whether normalization is necessary. Normalization standardizes various characteristics of the data. These characteristics may include size, scale, colors, resolution, and/or other aspects of the image and vector data. This may be especially needed if map image data is obtained from multiple providers. If normalization is needed, e.g. the map tiles have different characteristics, the data is normalized at block 435. In one embodiment, the system generates map tiles with a standard set of characteristics, e.g. all map tiles have the same size, scale, color distribution, resolution, etc. The process then ends at block 440.

Figure 5:
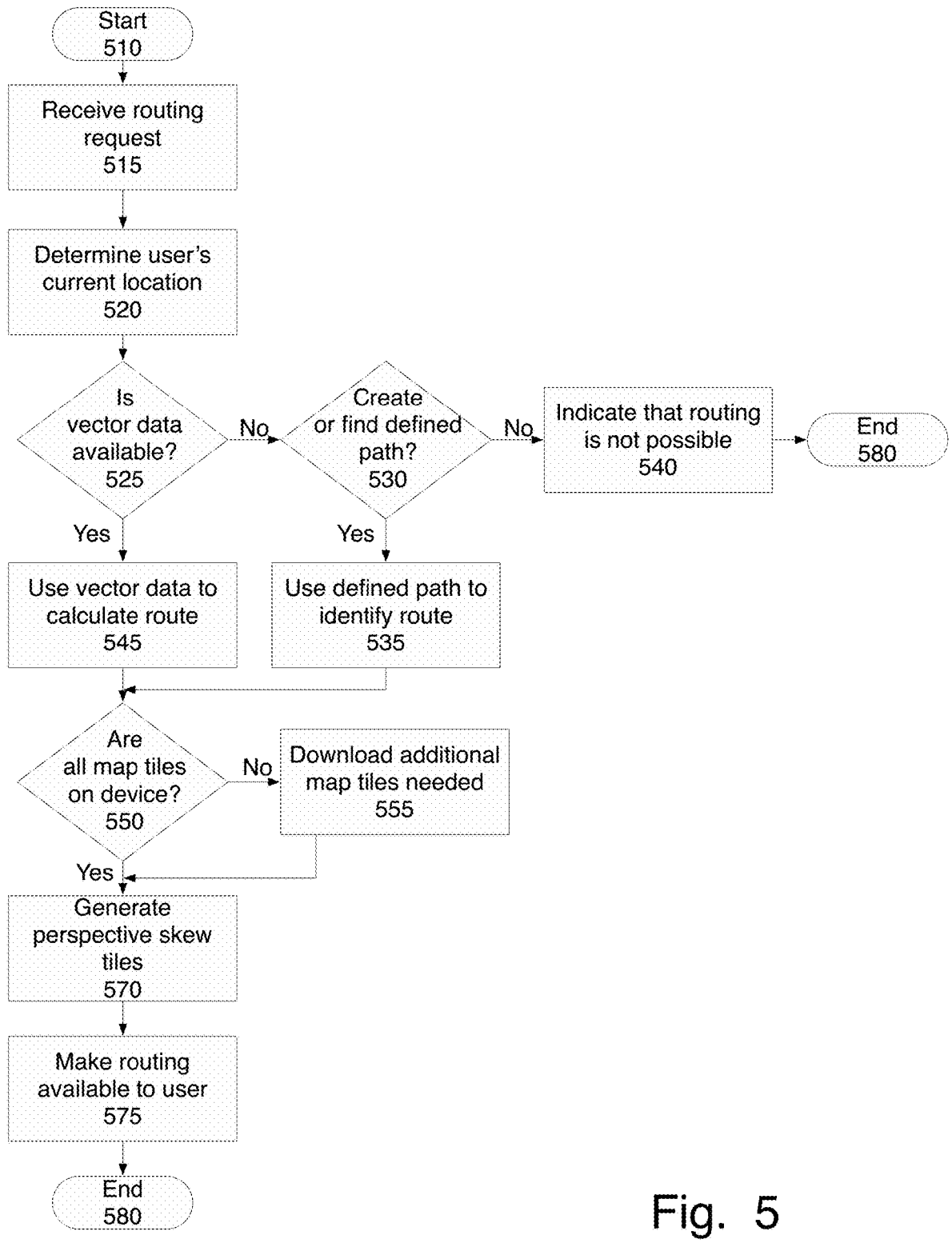
FIG. 5 is a flowchart of one embodiment of generating a route and associated map display.

FIG. 5 is a flowchart of one embodiment of generating a route and associated map display. The process starts at block 510. At block 515, a routing request is received. The routing request may indicate a starting point and a destination. This may be done using various methods, e.g. address book, data entry, search, etc.

At block 520, the user's current location is determined. The starting point for routing may be the user's current location. In another embodiment, the user may enter a starting location, rather than utilize their current location. In that case, in one embodiment, the user's location need not be determined.

At block 525, the process determines whether vector data is available. Vector data is generally used for routing, as it describes the roads, their connections, etc. This can be done on the mapping server, on the device, or the process may be split between the mapping server and the device. If the process is split, in one embodiment, the mobile device first attempts to obtain the vector data from memory, if that's not available from the mapping server, and if the server does not have such data directly from the vector data provider, If vector data is available, it is used, at block 545, to calculate a route. The process then continues to block 550.

If no vector data is available, the process at block 530 determines whether there is a defined path available or whether the user wishes to create such a defined path. A defined path is a path that is based on direct data input, such as GPS data, or tracing. In one embodiment, the system allows the generation of routes based on manual entry, e.g. a user or administrator tracing a route manually through an image map display. Alternative methods of defining the path may be used. In one embodiment, if vector data is not available the user can view the map and may manually pick a route. Of course, such a route would not take into account information the user wasn't aware of, such as one way streets. However, by being able to carefully review the entire map and lay out a route before embarking on the route, the user can be provided directions even in an environment where vector data, or other data used for routing, is not available. This manually indicated route is considered a defined path.

If no defined path is available, at block 540 the process indicates that no routing is possible, and ends at block 580.

If there is a defined path available, at block 535, the defined path is used to identify the route. The defined path is path data added via global positioning system (GPS) mapping, manual addition, etc. The process then continues to block 550.

At block 550, the process determines whether all map tiles needed to display the route are on the device. In one embodiment, the device may use one of three map storage methods. It may use an all-on-board method, a server-based method, or a hybrid method. All-on-board stores all map data, on the device, while a server-based system stores all map data on the server and provides map data only as needed. A hybrid method stores some map data on the device, but receives map updates, and additional map data when needed, from the server. If the method is a server-based or hybrid method, in one embodiment, the process can determine whether all map tiles are on the device, and if not, at block 555, download any additional map tiles needed. In one embodiment, map tiles may be downloaded as needed. However, this has the disadvantage of making map tiles unavailable if the user's signal is poor.

The perspective skew is generated at block 570. The perspective skew in one embodiment is generated in real-time, based on the user's current location and orientation. In one embodiment, the level of skew (e.g. the perspective angle) depends on the user's speed.

Once all of the map tiles are all available, at block 575, routing is made available to the user. In one embodiment, "all of the map tiles" means all of the map tiles that are needed for the current display, and additional map tiles needed for later parts of the route may be downloaded while the user is traveling. In one embodiment, when only a defined path is available, the routing may simply show the defined path on the 3D skewed image. In one embodiment, the system may detect turns, based on changes in angle in the defined path, and use the turn detection to provide announcements during routing. In one embodiment, these announcements would indicate information such as "Right turn in 1 mile." The process then ends.

Figure 6:
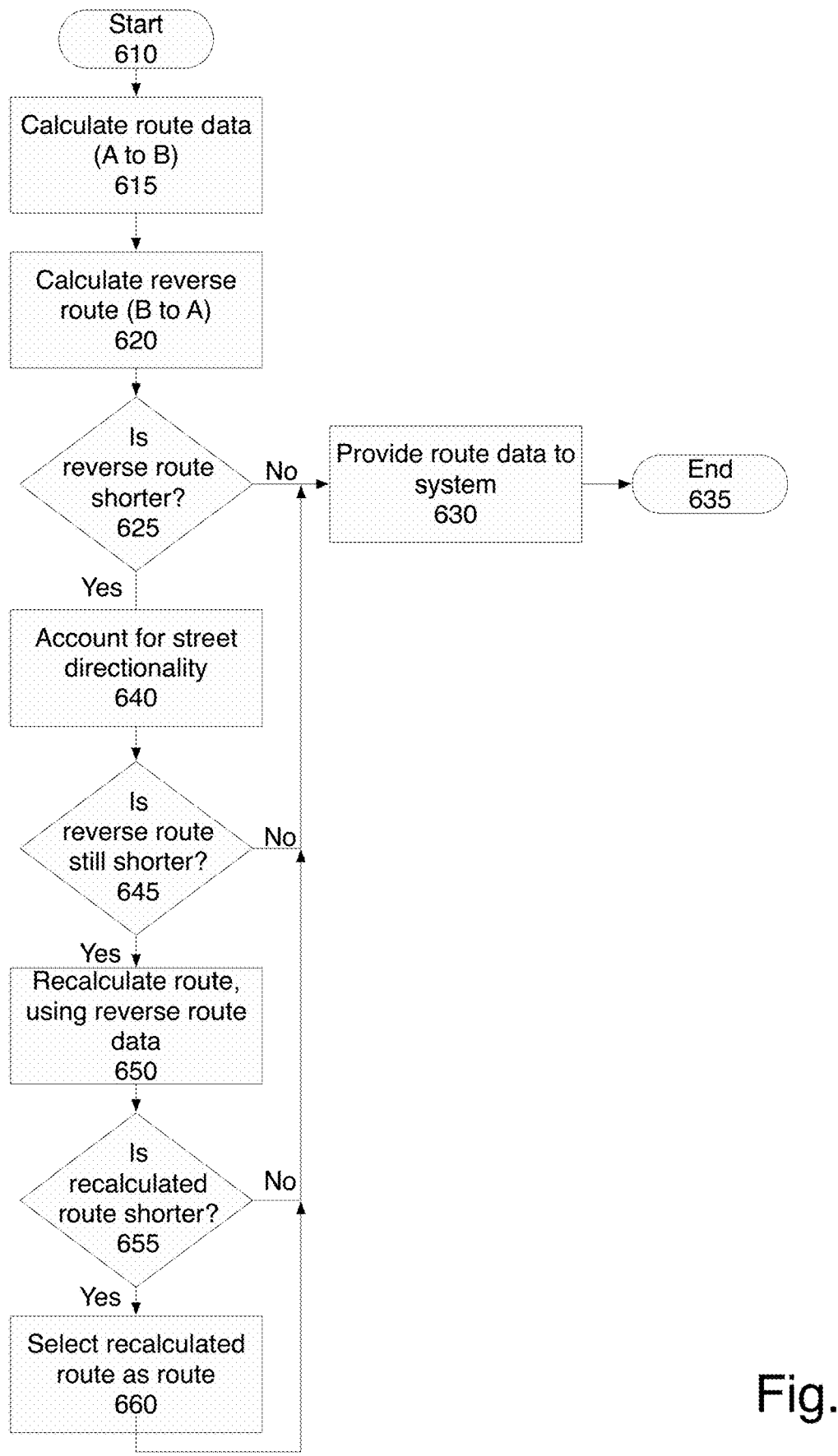
FIG. 6 is a flowchart of one embodiment of alternative route generation.

FIG. 6 is a flowchart of one embodiment of alternative route generation. In one embodiment, this process may be used in some instances, especially if the route appears to be longer than the straight distance between a first point (A) and a second point (B).

At block 615, the route from A to B is calculated. This is done using conventional means, as is known in the art. In one embodiment, the system calculates an "as the bird flies" straight distance between two points. If the calculated route is longer by 50% or more, the process continues as below. In one embodiment, the below process is always used. In another embodiment, the user may set the circumstances under which reverse routing is used. In one embodiment, the user may trigger reverse routing upon receiving the results of the initial routing from A to B.

At block 620, the reverse route is calculated, e.g. the route from B to A.

At block 625, the process determines whether the reverse route is shorter, e.g. whether B to A is shorter than A to B. In one embodiment, this comparison determines whether the difference is "significant." In one embodiment, this may be a 10% distance or time difference, more than one mile of difference, more than 10 minutes of estimated commute time difference, or any other setting. Thus, while 15.1 miles is different from 15.05 miles, the system would not indicate that as a difference, since such a difference is insignificant. If the reverse route is not significantly shorter, at block 630 the route calculated at block 615 is provided to the system. The process then ends at block 635.

If the reverse route is significantly shorter, the process at block 640 accounts for street restrictions. Street restrictions are streets which are one way streets, and streets which have turning limitations (e.g. no left turn). In some cases the difference in the routes is accounted for by such restrictions on the route.

At block 645, the process determines whether the route is still significantly shorter, once the street restrictions have been accounted for. If it is not, the process continues to block 630 to present the route data to the system.

If the reverse route is still significantly shorter, the system at block 650 recalculates the route, using the reverse route as a guide. In one embodiment, this is done using a preference for the paths identified by the reverse route.

At block 655, the process determines whether the recalculated route is shorter than the original route. If not, the original route is provided to the system, at block 630. If the recalculated route is shorter, at block 660, the recalculated route is selected, and at block 630 the recalculated route is provided to the system. In this way, any differential between the calculations is exploited to optimize the path.

Figure 7A:
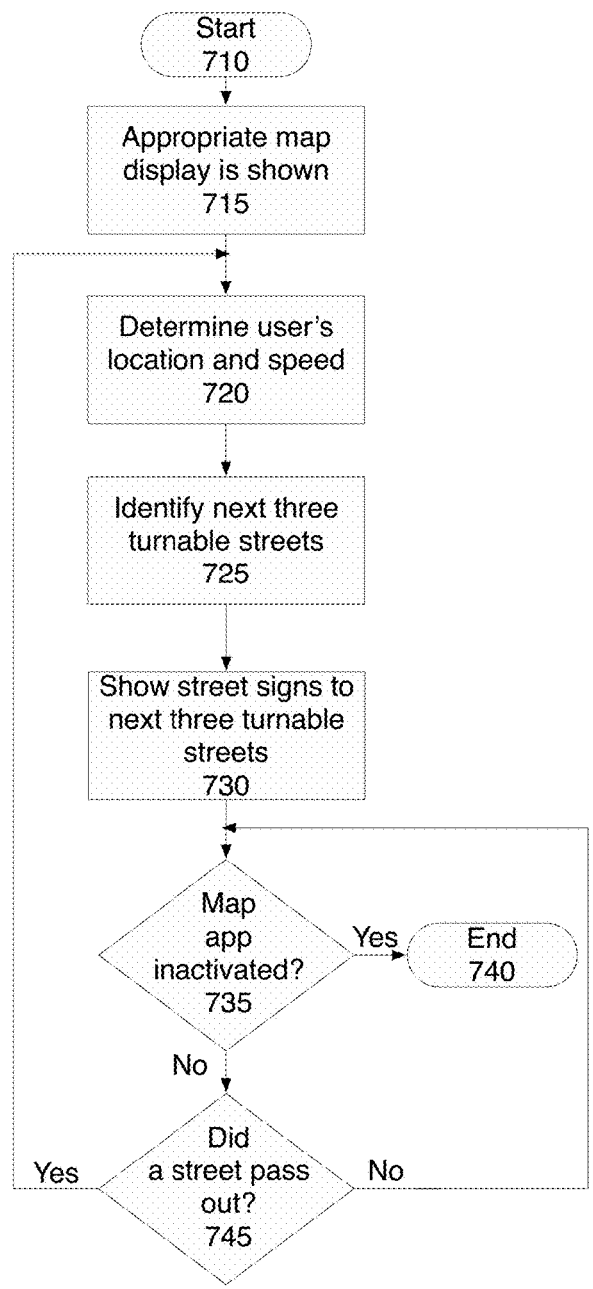
FIGS. 7A and 7B are flowcharts of embodiments of map display.
Figure 7B:
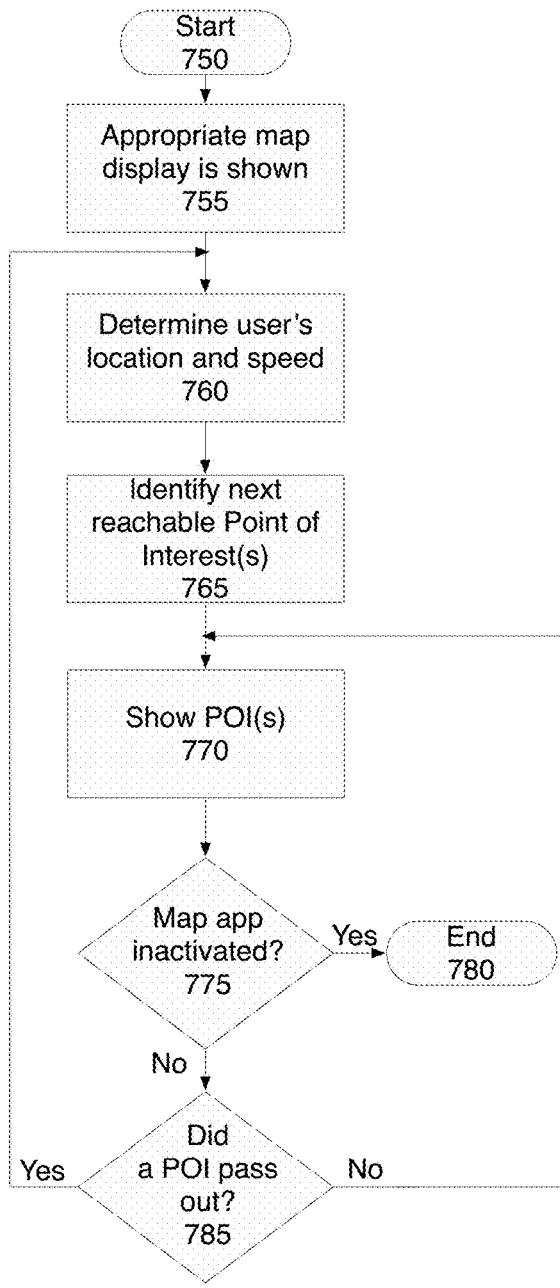

FIGS. 7A and 7B are flowcharts of embodiments of map display. FIG. 7A illustrates a flowchart of one embodiment of displaying street signs. In one embodiment, the process starts at block 710, when the mapping application is activated. In one embodiment, this process is associated only with a particular type of map display, e.g. the three dimensional course-up display. In that display, the top of the image shown corresponds to the direction in which the user is currently oriented. In one embodiment, the user may set the display to north-up views in which compass North is at the top of the image.

In one embodiment, the display mode may be Automatic/Auto. In the Automatic setting the view is changed based on the user's actions. In one embodiment, when the user is stopped the compass is used to orient the map view, so that the way in which the user is facing is at the top of the image. Thus, if the user is turning around in place, the map orients itself to where the user is looking. In one embodiment, when the user is driving or otherwise traveling at a high speed, the automatic mode switches to oriented view (based on which way the user is acting) when the user rotates in place. For examine, a bicyclist may get off the bike to look around, or a driver may get out of the car and look around. In one embodiment, the automatic mode would switch to "user orientation" display when such motion is detected. In one embodiment, when the user is moving, the user's heading is used to orient the map. In one embodiment, Automatic mode uses a compensated compass, meaning a system that uses the compass and compensates with data from accelerometer and/or gyroscope to be more accurate (by accounting for orientation of the device). In one embodiment, the display may be set to a two dimensional map, in which case in one embodiment standard street labels are displayed.

At block 715, the route-up three dimensional map display is shown. FIG. 9B illustrates one embodiment of this display format for routing.

At block 720, the user's current location and speed is determined. This speed may be zero if the user is not currently moving. This is used to determine the next set of turnable streets. A turnable street is a street on which the user can safely turn, given known directionality, speed, and location constraints. In one embodiment, the mode of travel of the user may also be taken into account. If the user is walking, for example, the available streets may differ from when the user is driving. For example, a street which is 20 feet away, when a user is driving in an inside lane at 60 miles per hour is not a reachable street. Nor is a one way street in the opposite direction. On the other hand, a one-way street the wrong way is a navigable path for someone walking. In one embodiment, the user's location takes into account the user's location in lanes on a freeway or other multilane road. In one embodiment, four turnable streets are identified. In another embodiment, a different number of streets may be part of the set. In one embodiment, the user may set a preference for the number of streets.

At block 730, the street signs are shown on the map for the set of turnable streets. The street signs, in one embodiment, are shown in direct view, e.g. as if the user were directly in front of a street sign. In one embodiment, the street sign is not perspective-distorted. In one embodiment, the street sign data is obtained from underlying vector data, while the image map shows features but not street names.

In one embodiment, this continues, removing streets passed from "reachable" to "unreachable" or passed, and adding a subsequent street to the set, until the user ends the map application, as determined at block 735. In one embodiment, in addition to the set number of streets ahead of the user, the system further displays a street sign associated with the road the user is on, as well as the road the user has just passed. Many people navigate based on bracketing, by noting the streets ahead and behind. In one embodiment, this can optionally be turned off. FIG. 9B shows the navigation showing the street behind the user, while FIG. 9C shows the navigation without the street behind the user. In one embodiment, the street the user is on may be shown with a different aspect than normal street signs. For example, the street sign may be shown in a different color or font, smaller, or differently shaped. Similarly, the street behind the user may be shown with a different aspect.

FIG. 7B illustrates one embodiment of the addition of points of interest to the display. The process starts at block 750. In one embodiment, this process is available when the user has routing or a map display open.

The points of interest, in one embodiment, may be selected by the user. For example, a user may, in a profile indicate an interest in drinking coffee or eating hamburgers. The user may indicate more precise preference, such as drinking coffee from Starbucks™ and eating hamburgers from McDonalds™. Alternatively, the system may, in one embodiment, generate a set of points of interest from the user's past behavior. For example, if the user has searched for and/or navigated to a number of Starbucks coffee shops in the past, it may be added to the user's point of interest. In one embodiment, if a user navigates to a particular store or service provider a set number of times (e.g. two or more, or another number), the system may upon next receiving the search ask whether the user wishes to make this a possible point of interest. This would enable a user to quickly add points of interest, without having to manually add any data.

At block 755, the appropriate map display is shown. If the user asks for routing, this may be a routing display. If the user just displays his or her location, this may be the locations nearby. In one embodiment, if the user is not viewing the map in the route-up mode, then all points of interest (POIs) visible on the map are displayed. However, if the route-up mode is used, the process described here is used to select POIs to display.

At block 760, the speed and location of the user is determined. As noted above, the speed may be zero.

At block 765, the next reachable POI(s) are identified. In one embodiment, only a single POI of each type (e.g. a single McDonalds') is shown. However, multiple POIs of different types may be included.

At block 770, the POIs are added to the map display, and maintained until the user passes them, block 785. This process continues until the user terminates the mapping application, in one embodiment. In one embodiment, the user may manually turn off the POI display.

Figure 8:
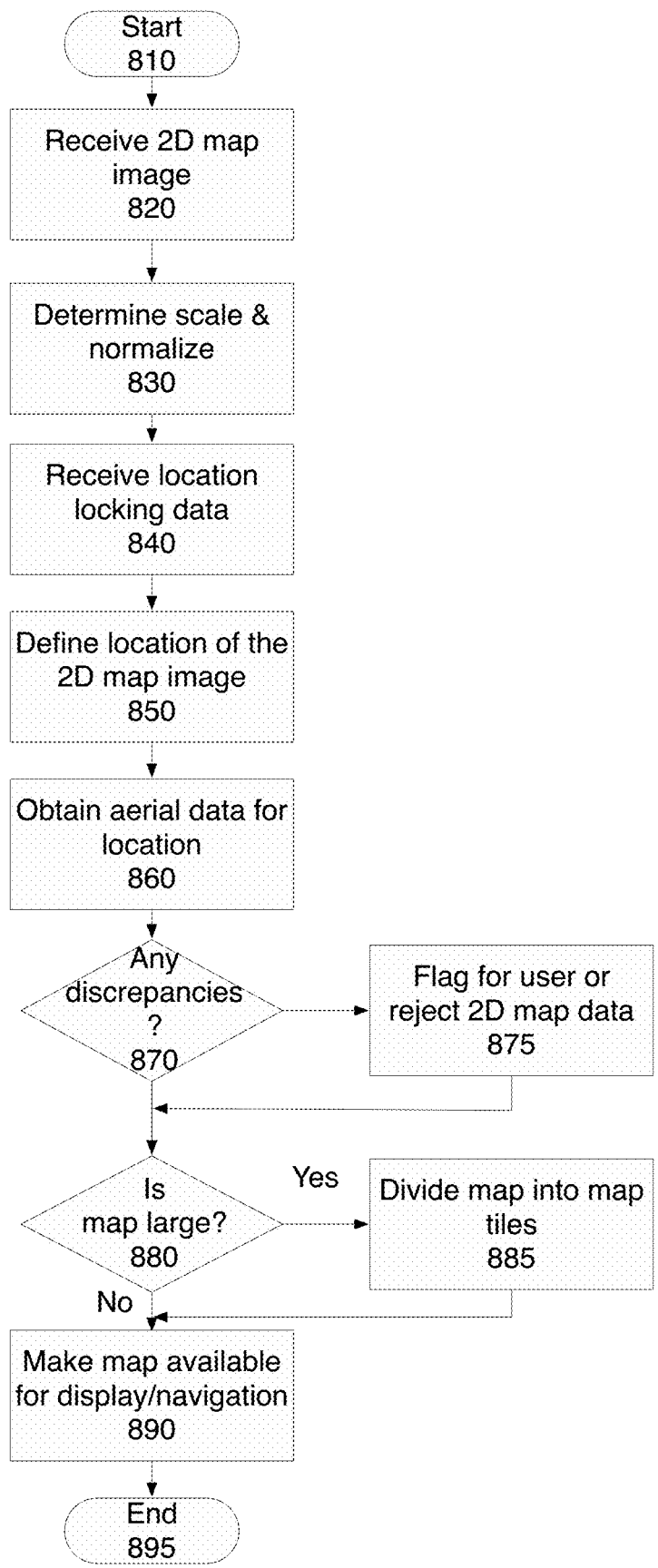
FIG. 8 is a flowchart of one embodiment of generating map data.

FIG. 8 is a flowchart of one embodiment of generating map data. In one embodiment, users may add additional information into the system, in the form of a map image, e.g. two-dimensional map information. For example, this information may be used to provide mapping data of school or workplace campuses, or other environments which are not available from traditional map information vendors. The process starts at block 810.

At block 820, two dimensional map image data is received. In one embodiment, this may be a PDF or similar image format which is uploaded to the system.

At block 830, the scale is determined and the map is normalized. Normalization brings the color tone and size into agreement with the other map data. In one embodiment, the map image data itself may include scaling information. If not, the user will be prompted, in one embodiment, to provide the scaling information.

At block 840, location locking data is received. Location locking data determines the precise location of the map image data. A flat image data needs to be fit into the mapping by coordinates or other information. In one embodiment, location coordinate data may be used to lock the 2D map image into its correct location. In another embodiment, street crossing data may be used to lock the map into the correct location.

At block 850, the location of the map image is defined. The location is GPS coordinates for all corners of the map, in one embodiment. This may be derived from the location locking data.

At block 860, aerial data is obtained for the location. Aerial data may be satellite data, or other available aerial image data.

In one embodiment, at block 870, the process overlays the aerial data to the 2D map image data, and determines if there are any discrepancies. In one embodiment, discrepancies are determined based on street locations, terminations, or angles. If there are discrepancies, at block 875, they are flagged for the user. In one embodiment, if the discrepancies are significant, the 2D map data is not added to the map repository until the user validates the map data and clears up any discrepancies.

At block 880, the process determines whether the map is large. In one embodiment, a map above a certain size is analyzed in smaller chunks, and the map is divided into map tiles 885.

At block 890, the map is made available for three dimensional display. As noted above, in one embodiment a navigable map is generated. In one embodiment, the user is asked to validate the navigable map. In one embodiment, for validation the routes traversable by various types of vehicles are indicated in different colors or otherwise identified. This enables a user to correct a map which, for example, identified a bike path as a street. In one embodiment, if aerial views of the area are available, the system may add an aerial view to the 2D map image provided by the user to more correctly analyze the information. In one embodiment, the user may be asked to trace the routes, to manually enter the path data, as discussed above.

The system generates the 3D perspective view of the map. In one embodiment, this is done real time as the user moves through the map. In one embodiment, the navigation-enablement may be the display of the user moving along the map display. In one embodiment the system may simply provide a current location on the image map display. In one embodiment, the system may use a combination of GPS, network triangulation, wireless signal, and a step counter or other activity analysis logic. This enables, in one embodiment, the use of the system within a building. The process then ends at block 895.

Figure 10:
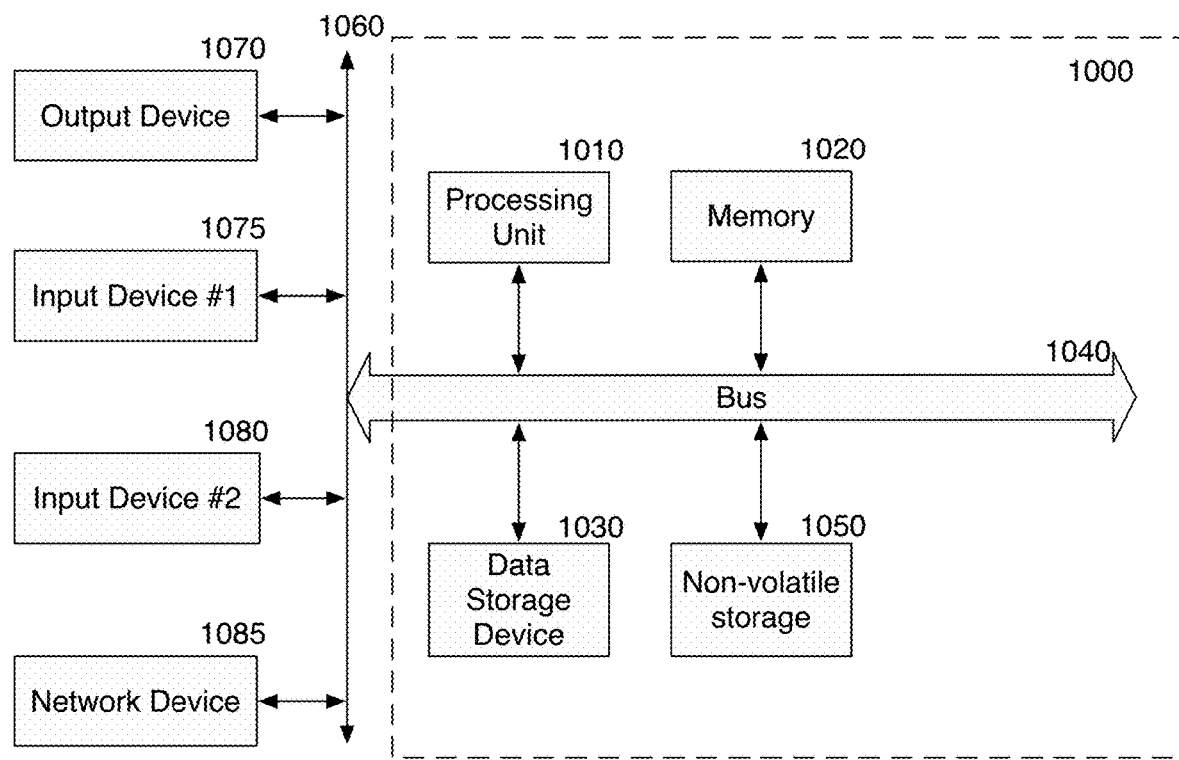
FIG. 10 is a block diagram of one embodiment of a computer system which may be used with the present invention.

FIG. 10 is a block diagram of a particular machine which may be used with the present invention. It will be apparent to those of ordinary skill in the art, however that other alternative systems of various system architectures may also be used.

The data processing system illustrated in FIG. 10 includes a bus or other internal communication means 1040 for communicating information, and a processing unit 1010 coupled to the bus 1040 for processing information. The processing unit 1010 may be a central processing unit (CPU), a digital signal processor (DSP), or another type of processing unit 1010.

The system further includes, in one embodiment, a random access memory (RAM) or other volatile storage device 1020 (referred to as memory), coupled to bus 1040 for storing information and instructions to be executed by processor 1010. Main memory 1020 may also be used for storing temporary variables or other intermediate information during execution of instructions by processing unit 1010.

The system also comprises in one embodiment a read only memory (ROM) 1050 and/or static storage device 1050 coupled to bus 1040 for storing static information and instructions for processor 1010. In one embodiment the system also includes a data storage device 1030 such as a magnetic disk or optical disk and its corresponding disk drive, or Flash memory or other storage which is capable of storing data when no power is supplied to the system. Data storage device 1030 in one embodiment is coupled to bus 1040 for storing information and instructions.

The system may further be coupled to an output device 1070, such as a cathode ray tube (CRT) or a liquid crystal display (LCD) coupled to bus 1040 through bus 1060 for outputting information. The output device 1070 may be a visual output device, an audio output device, and/or tactile output device (e.g. vibrations, etc.)

An input device 1075 may be coupled to the bus 1060. The input device 1075 may be an alphanumeric input device, such as a keyboard including alphanumeric and other keys, for enabling a user to communicate information and command selections to processing unit 1010. An additional user input device 1080 may further be included. One such user input device 1080 is cursor control device 1080, such as a mouse, a trackball, stylus, cursor direction keys, or touch screen, may be coupled to bus 1040 through bus 1060 for communicating direction information and command selections to processing unit 1010, and for controlling movement on display device 1070.

Another device, which may optionally be coupled to computer system 1000, is a network device 1085 for accessing other nodes of a distributed system via a network. The communication device 1085 may include any of a number of commercially available networking peripheral devices such as those used for coupling to an Ethernet, token ring, Internet, or wide area network, personal area network, wireless network or other method of accessing other devices. The communication device 1085 may further be a null-modem connection, or any other mechanism that provides connectivity between the computer system 1000 and the outside world.

Note that any or all of the components of this system illustrated in FIG. 10 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 1020, mass storage device 1030, or other storage medium locally or remotely accessible to processor 1010.

It will be apparent to those of ordinary skill in the art that the system, method, and process described herein can be implemented as software stored in main memory 1020 or read only memory 1050 and executed by processor 1010. This control logic or software may also be resident on an article of manufacture comprising a computer readable medium having computer readable program code embodied therein and being readable by the mass storage device 1030 and for causing the processor 1010 to operate in accordance with the methods and teachings herein.

The present invention may also be embodied in a handheld or portable device containing a subset of the computer hardware components described above. For example, the handheld device may be configured to contain only the bus 1015, the processor 1010, and memory 1050 and/or 1025.

The handheld device may be configured to include a set of buttons or input signaling components with which a user may select from a set of available options. These could be considered input device #1 1075 or input device #2 1080. The handheld device may also be configured to include an output device 1070 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 1010, a data storage device 1030, a bus 1040, and memory 1020, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1085.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    displaying a route-up map including a plurality of streets for guiding a user to a location;
    calculating a user's current location and based on the user's current location, determining a first subset of the plurality of streets that are directly accessible and turnable from the user's current location;
    displaying street names for the first subset of the plurality of streets shown on the map, that are directly accessible and turnable from the user's current location along the user's path,
    not displaying the street names for a second subset of streets that are not directly accessible from the user's current location, the second subset of streets including streets ahead of the user that are not accessible from the user's current location and streets behind the user's current location.

2. The method of claim 1, wherein the map includes an indication of the user's current location, and the user's current location is defined by one or more of: a global positioning system, a network location system, an accelerometer, a gyroscope, a magnetometer and a pressure sensor.

3. The method of claim 1, further comprising:
    displaying a flat map including street names for the first plurality of streets and the second plurality of streets.

4. The method of claim 1, wherein the user's path is defined by a direction in which the user is facing, wherein the direction in which the user is facing is determined based on one or more of: a global positioning system, a map orientation, a network location system, an accelerometer, a gyroscope, a magnetometer, and a pressure sensor.

5. The method of claim 1, wherein displaying the map further comprises:
    obtaining map tiles, a combination of the map tiles forming a two-dimensional flat map image;
    displaying a map image of a perspective skewed map, the perspective skewed map image generated from the two-dimensional flat map image, the perspective skewed map including a plurality of streets.

6. The method of claim 5, further comprising:
    obtaining the map tiles and vector data for an area associated with the map tiles; and
    reconciling the map tiles and the vector data to ensure that the information represented by the map image and the vector data matches.

7. The method of claim 1, wherein the map comprises a plurality of map tiles, and the plurality of map tiles are sourced from at least two sources of flat map tiles.

8. The method of claim 7, wherein a source for a map tile is selected from among a plurality of providers based on one or more of: a resolution, a size, a cost, and a date of last update.

9. The method of claim 7, further comprising:
    normalizing the plurality of map tiles.

10. The method of claim 1, further comprising:
    calculating a route between a first position and a second position;
    calculating a reverse route;
    comparing the route and the reverse route, and adjusting the route based on information from the reverse route.

11. A mapping application comprising, on a display screen displaying data generated by a processor, the generated data comprising:
    a map image generated by the processor, the map image showing a plurality of streets;
    street signs with street names displayed only for a first subset of the plurality of streets shown on the map image, directly accessible from the user's current location and along the user's path, and
    no street signs displayed for a second subset of the plurality of streets that are not directly accessible from the user's current location, the second subset of streets including streets ahead of the user that are not accessible to the user from the user's current location and streets behind the user.

12. The mapping application of claim 11, wherein the map includes an indication of the user's current location, and the user's current location is defined by one or more of: a global positioning system, a network location system, an accelerometer, a gyroscope, a magnetometer and a pressure sensor.

13. The mapping application of claim 11, further comprising:
a path from a first location to a second location for the user, wherein the user's path is defined by a route selected by the user, and a direction in which the user is facing, determined based on one or more of: a global positioning system, a map orientation, a network location system, an accelerometer, a gyroscope, a magnetometer, and a pressure sensor.

14. A mapping system comprising:
a map data acquisition logic to obtain map data, the map data including a map with plurality of streets;
a street sign placer to identify a first subset of the plurality of streets based on a current location and route of a user, the identification comprising identifying the subset of streets that are directly accessible from the user's current location and along the user's route, and placing street signs only on the first subset of the plurality of streets, such that a second subset of the plurality of streets that are not directly accessible from the user's current location have no street signs, wherein the second subset of the plurality of streets includes streets ahead of the user that are not accessible to the user from the user's current location and streets behind the user's current location.

15. The mapping system of claim 14, wherein the map data is made up of a plurality of map tiles, the map tiles sourced from a plurality of sources, such that the map includes map tiles from at least two sources.

16. The mapping system of claim 15, wherein the source is selected from among a plurality of providers based on one or more of: a resolution, a size, a cost, and a date of last update.

17. The mapping system of claim 15, further comprising:
a normalizer to normalize the map data to a uniform scale, uniform resolution, and uniform image format.

18. The mapping system of claim 14, further comprising:
the map data acquisition logic to obtain vector data associated with the map data; and
a mapper to reconcile the map data and the vector data to ensure that the information represented by the map data and the vector data matches.

19. The mapping system of claim 14, further comprising:
a router to calculate a route between a first position and a second position and to calculate a reverse route;
a reverse route logic to compare the route and the reverse route, and to adjust the route based on information from the reverse route.

20. The mapping system of claim 14, further comprising:
the map data acquisition logic to receive an image with mapping data and a scale associated with the image;
a flat map processor to generate one or more map tiles based on the image; and
the skewer to generate one or more perspective skewed map tiles based on the one or more map tiles.

* * * * *